United States Patent
Fischbach

(10) Patent No.: US 9,201,480 B2
(45) Date of Patent: Dec. 1, 2015

(54) METHOD AND SYSTEM FOR DETERMINING AN ARBITRARY CHARGING PROTOCOL IN USB CHARGING PORTS

(75) Inventor: Christopher Fischbach, Tucson, AZ (US)

(73) Assignee: STANDARD MICROSYSTEMS CORPORATION, Hauppauge, NY (US)

( * ) Notice: Subject to any disclaimer, the term of this patent is extended or adjusted under 35 U.S.C. 154(b) by 932 days.

(21) Appl. No.: 12/978,371

(22) Filed: Dec. 23, 2010

(65) Prior Publication Data

US 2012/0166173 A1 Jun. 28, 2012

(51) Int. Cl.
*H02J 7/00* (2006.01)
*G06F 1/26* (2006.01)

(52) U.S. Cl.
CPC ............... *G06F 1/266* (2013.01); *H02J 7/0073* (2013.01); *H02J 2007/006* (2013.01); *H02J 2007/0062* (2013.01); *Y02B 40/90* (2013.01)

(58) Field of Classification Search
CPC ............................ G06F 9/455; G01R 31/2848
USPC .................................................. 320/111, 107
See application file for complete search history.

(56) References Cited

U.S. PATENT DOCUMENTS

| | | | |
|---|---|---|---|
| 5,177,440 A * | 1/1993 | Walker et al. | 714/736 |
| 5,428,560 A * | 6/1995 | Leon et al. | 703/13 |
| 8,055,919 B2 | 11/2011 | Magnusson | 713/300 |
| 2008/0086668 A1 * | 4/2008 | Jefferson et al. | 714/741 |
| 2010/0219790 A1 * | 9/2010 | Chadbourne et al. | 320/107 |

FOREIGN PATENT DOCUMENTS

| | | | | |
|---|---|---|---|---|
| TW | 201019086 A | 5/2010 | | G06F 1/18 |
| TW | 201035727 A | 10/2010 | | G06F 1/18 |

OTHER PUBLICATIONS

Taiwan Office Action, Application No. 100147512, 7 pages.

* cited by examiner

*Primary Examiner* — Edward Tso
*Assistant Examiner* — Johali Torres Ruiz
(74) *Attorney, Agent, or Firm* — Slayden Grubert Beard PLLC

(57) ABSTRACT

An emulation system for determining an arbitrary charging protocol in USB charging ports and for optimally charging portable devices. The emulation system comprises a power switch for powering on the emulation system, a high-speed data switch for transferring data to and from the portable device, a USB receptacle port including data pins ($D_P$ and $D_M$), $V_{BUS}$, and GND. The emulation system further comprises a profile database that stores one or more charging profiles including one or more stimulus-response pairs for each charging profile. The emulation circuit further includes emulation circuitry for detecting stimulus generated by the portable device and for generating responses according to the charging profiles.

18 Claims, 3 Drawing Sheets

METHOD AND SYSTEM FOR DETERMINING AN ARBITRARY CHARGING PROTOCOL IN USB CHARGING PORTS

TECHNICAL FIELD

The present invention relates to portable devices, and more particularly to a system and method for charging the batteries of portable devices.

BACKGROUND

Portable electronic devices such as mp3 players, cameras, and cell phones are typically fitted with a USB port, which allows them to transfer data to or from other controllers or hosts. Using these USB ports, portable devices may conveniently draw current from personal computers to charge their batteries. In light of this convenience, engineers have developed standalone or dedicated USB chargers that expose a USB standard receptacle to the portable devices, allowing them to use the same USB port to charge either from a computer or a dedicated USB charger.

The advent of dedicated USB chargers has, however, increased charging complexity. Now, different type of USB charging ports are available, such as standard USB ports, charging downstream ports, and dedicated charging ports. Moreover, these ports allow portable devices to draw current in different ranges. Portable devices, therefore, have to identify the port type before they can begin drawing current from the ports. Ascertaining the type of port can often become difficult.

To overcome this difficulty, the USB Battery Charging Working Group has introduced a Battery Charging Specification (BCS), which describes a charging port detection handshake protocol, allowing BCS compatible devices to detect the type of USB port before drawing current. Though this protocol allows compatible devices to begin charging, this handshake introduces a problem for legacy devices such as RIM® and Apple® products.

Legacy products do not follow the BCS protocol; therefore, when these devices are connected to a personal computer or USB charger, they may not be able to detect the port type. Moreover, because legacy devices cannot identify the port type, they may be allowed to draw minimal current (80-100 mA) from the charging port or no current at all.

Also, though the BCS indicates the necessary actions for a BCS compliant charging device to perform, it makes no qualifications on the timing of these actions. Some portable devices may require action in a specific timeframe. If the charging device does not respond within this timeframe, the portable device may not be able to draw charging current from the device.

Therefore, there remains a long-felt but unresolved need for a system or method for detecting port type for all types of portable devices including BCS compatible and legacy devices.

SUMMARY

Briefly described, and according to one embodiment, the present disclosure describes an emulation system for determining an arbitrary charging protocol in USB charging ports and charging portable devices optimally. The emulation system comprises a power switch for powering on the emulation system, a high-speed data switch for transferring data to and from the portable device, a USB receptacle port including data pins ($D_P$ and $D_M$), $V_{BUS}$, and GND. The emulation system further comprises a profile database that stores one or more charging profiles including one or more stimulus-response pairs for each charging profile. The emulation circuit further includes emulation circuitry for detecting stimulus generated by the portable device and for generating responses according to the charging profiles.

Figure 1:
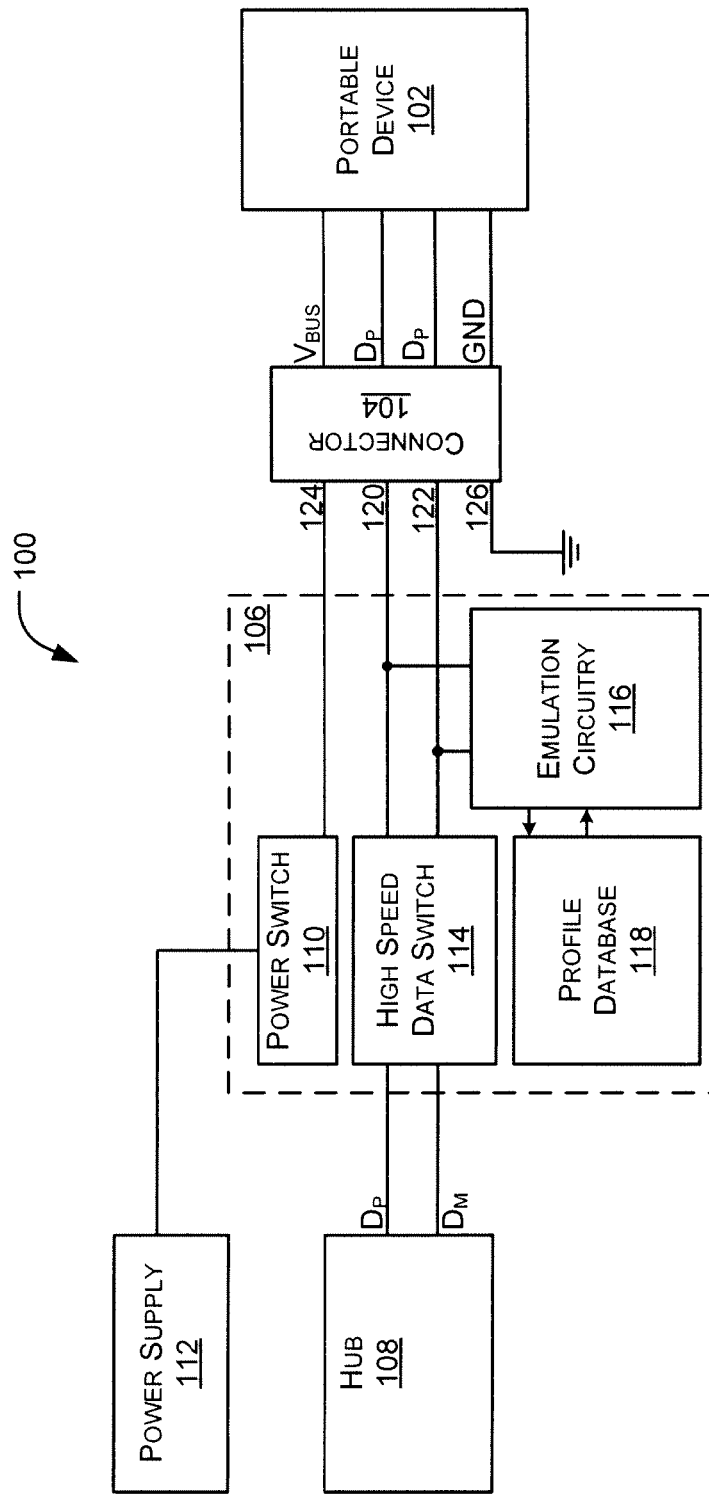
FIG. 1 illustrates an exemplary battery charging system according to embodiments of the present invention.

While the invention is amenable to various modifications and alternative forms, specific embodiments are shown by way of example in the drawings and are described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

Overview

The following terms are used throughout this document and are defined here for clarity and convenience.

Attach: refers to a physical electrical connection between a downstream device and an upstream port.

Connection: refers to the state when a downstream device is attached to an upstream port, and when the downstream device has pulled either $D_P$ (Data Plus) or $D_M$ (Data Minus) signals high through a resistor, in order to enter signaling.

Disconnect: refers to the loss of active USB communications between a USB host and a USB device.

Standard Downstream Port: refers to a downstream port on a device that complies with the USB2.0 definition of a host or a hub. The standard downstream port expects a downstream device to draw less than 2.5 mA when unconnected, up to 100 mA when connected, and up to 500 mA if so configured and not suspended.

Charging Downstream Port (CDP): refers to a downstream port on a device that complies with the USB 2.0 definition of a host or a hub, except that a downstream device is permitted to draw in excess of 500 mA up to $I_{DCHG}$ while simultaneously communicating with a host device.

Dedicated Charging Port (DCP): refers to a downstream port on a device that outputs power through a USB connector, but is not capable of enumerating a downstream device. A dedicated charging port is required to allow a downstream device to draw at a minimum current of $I_{DCHG}$ at an average voltage of $V_{CHG}$.

DCD (Device Connection Detection): refers to an action taken by downstream devices, when $V_{BUS}$ is applied, to determine when the $D_P$ and $D_M$ pins are connected to a USB host.

Legacy Device: refers to USB devices that require application of non-BCS signatures on the $D_P$ and $D_M$ pins prior to application of $V_{BUS}$ to enable charging.

Downstream Device: refers to USB device connected on the $D_P$ and $D_M$ pins of a host device and that acts as a slave to the host device.

Charger Emulation Profile: refers to the reactive handshake applied on the $D_P$ and $D_M$ pins to emulate a specific charger type such as a BCS CDP or a legacy dedicated charger device.

Power Thief: refers to a USB device that does not follow the handshaking conventions of a BCS1.1 device or Legacy devices and draws current immediately upon receiving power (i.e. a USB book light, portable fan, etc).

USB Charger: refers to a device with a dedicated charging port, such as a wall adapter or a car power adapter.

Portable Device: refers to any USB or on-the-go (OTG) device that is capable of operating from its own battery, and is also capable of drawing current from its USB port for the purpose of operating and/or charging its battery.

When a portable device is connected to a USB port it starts charging its batteries (if they are not fully charged). The amount of current a portable device extracts from a USB port depends on the type of USB port and the ability of the portable device to identify the port type. For example, if the device identifies a USB port as a dedicated charging port or a charging downstream port, it may draw up to 1.8 A current from the port. Alternatively, if the portable device identifies the USB port as a standard downstream port, it may draw up to 2.5 mA from the port. Moreover, if a portable device is unable to identify the type of port, it may draw only about 2.5 mA from the port, even though the port may be a dedicated charging port. 2.5 mA may be enough current to sufficiently charge a portable device; the amount of time required to fully charge the batteries of a portable device at this rate, however, may be very long.

As described previously, a number of different standards and protocols are utilized by portable devices to identify the type of USB port and begin charging efficiently. For example, some devices comply with the Battery Charging Specification (BCS 1.1), while legacy devices such as RIM® and Apple® devices utilize their own charging protocols. RIM® devices, for instance, require installation of certain drivers on the host or hub for the devices to recognize the USB port.

Embodiments of the present invention are directed to a universal battery charging system that can emulate any known USB port, and charging protocol or profile, efficiently charging the batteries of a USB supported portable device. To this end, the system and method employ a combination of stimulus-response pairs for the charging profiles. When a particular set of stimulus-response pairs is satisfied, the portable device 102 begins charging efficiently. By selecting a combination of stimulus inputs that the circuit can detect, together with response outputs that the system can apply to the USB port, any arbitrary charging profile can be constructed. In that manner, any portable device can identify the connected device and start charging. The charger profiles may be controlled via a registered value accessible via a communications bus which in turn drives a series of hardware multiplexers that apply comparators, resistors, voltage sources, and current sources on the USB port's data pins.

Exemplary Systems

FIG. 1 illustrates an exemplary battery charging system 100 according to embodiments of the present invention. The battery charging system 100 includes a portable device 102 with a USB connector 104. The connector 104 attaches the portable device 102 to an emulation circuit 106. This circuit, in turn, may be connected to a USB Hub or Host 108, such as a computing device.

The emulation circuit 106 includes a power switch 110 for powering the circuit. The power switch 110 is connected to an external power supply 112 (such as the power supply of the host computing system). The emulation circuit 106 further includes a high-speed data switch 114 for transferring data from the hub 108 to the portable device 102 and vice versa. Further, the emulation circuit 106 includes emulation circuitry 116 such as voltage and current sources, resistors, comparators, or current sinks, which are controlled by a profile database 118 to produce the required response and detect inputs. The profile database 118 includes a defined set of levels, profile sequences, and particular charging profiles that control the emulation circuitry 116.

The USB connector 104 and the emulation circuit 106 includes 4 pins, Data (plus) $D_P$ 120, Data (minus) $D_M$ 122, Voltage $V_{BUS}$ 124, and Ground GND pin 126. Data is transferred to and from a portable device 102 through the data pins. $V_{BUS}$ 124 provides a voltage of 5V across the USB port, and GND 126 connects the USB connector 104 to ground.

When the power switch 110 is turned on, the emulation circuit 106 is powered and ready to charge the portable device 102. When the power switch 110 is switched off, the emulation circuit 106 lies in a low power state.

To emulate different charging protocols, the profile database 118 maintains multiple charging profiles including the BCS charging port detection protocol (charging downstream port, dedicated charging port, and standard downstream port), RIM" handshake protocol, Apple® handshake protocol, and multiple configurable profiles. For example, the configurable profiles may be utilized to charge certain portable devices that are not compatible with the BCS protocol, such as certain handsets manufactured by small entities in China.

Each charging profile includes multiple stimulus-response pair definitions. A stimulus may be an input detected on any of the USB port pins. The stimulus is typically generated by the portable device 102. The emulation circuit 106 detects these stimuli and generates a response, which corresponds to the received stimulus. Information about the stimuli and corresponding responses may be stored in look-up tables in the profile database 118.

A stimulus or response typically includes stimulus or response name, stimulus or response type, magnitude, threshold value, stimulus timer, and response timer. The stimulus timer governs the time within which a stimulus is expected. If the portable device 102 does not generate the expected stimuli in a given timeframe, the charging profile is discarded and the portable device 102 is reset. The response timer may govern the duration for which a response is applied or it may govern the duration before a response is applied. In some cases, the timer is started as soon as a stimulus is detected and the corresponding response is applied immediately. When the timer expires, if the stimulus is still present, the response remains applied until the stimulus is removed. If the stimulus is not present when this timer expires, the response is removed immediately. In other cases, when a stimulus is detected, the response timer is started. When the timer expires, the response is applied and held until the stimulus is removed. In addition to these timers, the profile includes a profile timer, which functions along with the stimulus and response timers. This timer dictates the overall time allocated to a particular profile. If a profile is not completed in the time specified by the profile timer, the profile is abandoned, and the emulation circuit 106 may apply the next profile.

In one embodiment, the charging profiles may include between 2-3 stimulus-response pairs. It will be understood, however, that greater or lesser number of stimulus-response pairs may be utilized without departing from the scope of the present invention. Further it will be understood that any type of stimulus-response pairs may be devised without departing from the scope of the present invention.

Stimulus examples may include voltage applied on $V_{BUS}$ 124, voltage below or above a certain threshold value, current below or above a certain threshold value. Response examples may also include voltage applied on the voltage pin or the data pins, voltage or current values above or below a certain threshold value, etc. In order to detect the stimulus signals and to provide the response signals, the emulation circuitry 116 is utilized. For example, comparator circuits may determine whether the detected signal is below or above a particular threshold value. Current and voltage sources may provide the threshold current and voltages for the comparison. Similarly, pull-up or pull-down resistors may be utilized to produce a high or low signal; voltage and current sources may be utilized to produce a current or voltage signal, and so on. In one embodiment, the response is applied to the data pins either individually or simultaneously.

When a charging profile is applied, the emulation circuit 106 applies $V_{BUS}$ and waits for a stimulus from the portable device 102. Upon detecting the stimulus, the emulation circuit 106 applies the corresponding response. This process continues for all the stimulus-response pairs defined for the particular profile. If all the stimulus-response pairs for a particular profile are applied in the desired order, the portable device 102 may begin charging. Else, the emulation circuit 106 resets the portable device's power pin $V_{BUS}$ 124 and applies the next emulation profile, repeating the stimulus-response process again.

In one embodiment, the charging profiles may be defined according to a set of rules. For example, the response to a stimulus has to be removed before the next stimulus in the profile is checked; unless, the first stimulus relates to the power pin $V_{BUS}$ 124. In that case, the response is not removed before the next stimulus is checked. Similarly, the emulation circuit 106 may detect only one stimulus at any given time and apply only one response per detected stimulus. Moreover, the emulation circuit 106 may detect stimuli only in a particular order for a charging profile to be successfully applied.

Exemplary Methods

Figure 2:
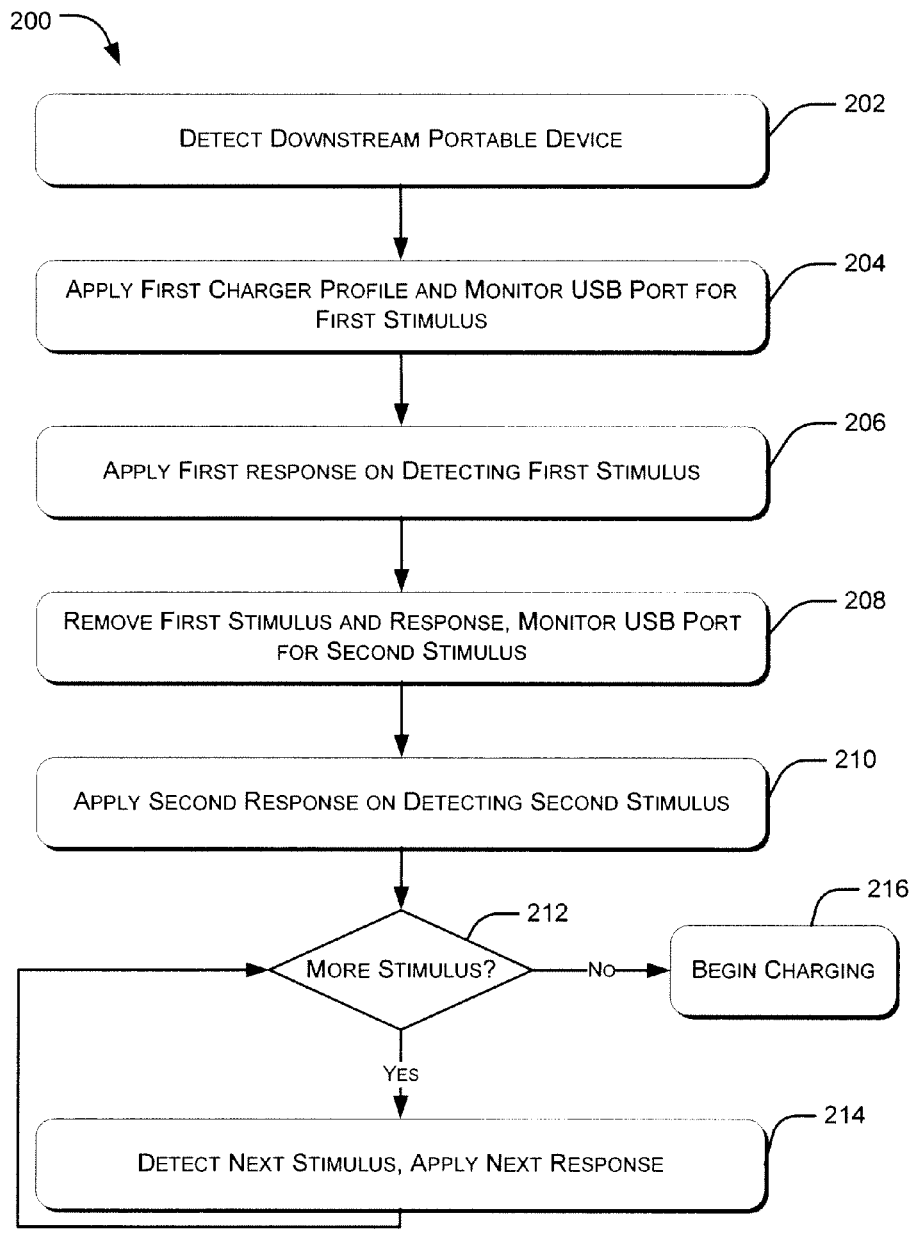
FIG. 2 is a flowchart illustrating an exemplary battery charging method according to embodiments of the present invention.

FIG. 2 illustrates an exemplary method 200 for charging an arbitrary downstream portable device 102. The method 200 illustrated in FIG. 2 may be used in conjunction with any of the systems or devices shown in the previously described figure, among other devices. In various embodiments, some of the method elements shown may be performed concurrently, in a different order than shown, or may be omitted. Additional method elements may be performed as desired. As shown, the method 200 may operate as follows.

At step 202, a downstream portable device is detected. A portable device, such as the portable device 102 may be attached to the emulation circuit 106 via the USB connector 104. Once the emulation circuit 106 has detected a downstream device, it applies $V_{BUS}$ to the downstream device. This signal acts as a trigger for the downstream device to begin detecting the port.

Next, at step 204, the emulation circuit 106 begins the first profile in the list of charger profiles maintained by the profile database 118. The order of profiles may be set by an engineer or user as required. In one embodiment, the first charger profile may be the BCS dedicated charger emulation cycle or the charging downstream port emulation cycle. Here, the emulation circuit 106 retrieves the first stimulus definition from the profile database 118 and monitors the USB port pins to detect this stimulus.

At step 206, the emulation circuit 106 applies a first response to one or both data pins (as defined by the response 1 setting) on detecting the first stimulus. The response definition may be retrieved from the profile database 118 and applied to the emulation circuitry 116. The emulation circuitry 116 in turn applies the response on the USB port pins and begins the timer. This response is applied as long as the stimulus is applied, or as long as the timer lasts. Alternatively, on sensing the stimulus, the emulation circuit 106 may apply the response timer. When the timer expires, the response is applied and held while the stimulus applied. When the stimulus is removed, the response is also removed.

At step 208, the first stimulus is removed and consequently the first response is removed. The emulation circuit 106 then monitors the voltage and data pins for the second stimulus as defined in the stimulus 2 settings. If the first stimulus is a signal on the power pin $V_{BUS}$, the emulation circuit 106 does not wait for the first stimulus and response to be removed before it monitors the port pins for the second stimulus.

At step 210, the emulation circuit detects stimulus 2 and applies response 2 to one or both of the data pins, or the voltage pin (as defined in the response 2 setting). Response 2 is applied as long as stimulus 2 is present. Once the second stimulus is removed, the emulation circuit 106 removes response 2.

At step 212, the emulation circuit 106 checks if any more stimuli are present for the charger profile. If yes, it monitors the voltage and data pins for the next stimulus at step 214. Upon stimulus detection, the emulation circuit 106 applies the corresponding response on one or both of the data pins as defined by the response settings.

The method then repeats steps 212-214 until all stimulus-response pairs are applied. If at step 212, no stimulus is left for the charger profile, the last response remains applied until the down-stream portable device 102 starts to draw charging current at step 216 or the emulation profile timeout is reached.

If at any step, the portable device 102 does not apply the required stimulus and the charger profile times out; the emulation circuit 106 resets and repeats steps 202-212 for the next emulation profile in the database.

Example 1

BCS 1.1 Charging Downstream Port

This section describes the emulation cycling process with the help of the BCS 1.1 charging downstream port profile.

Figure 3:
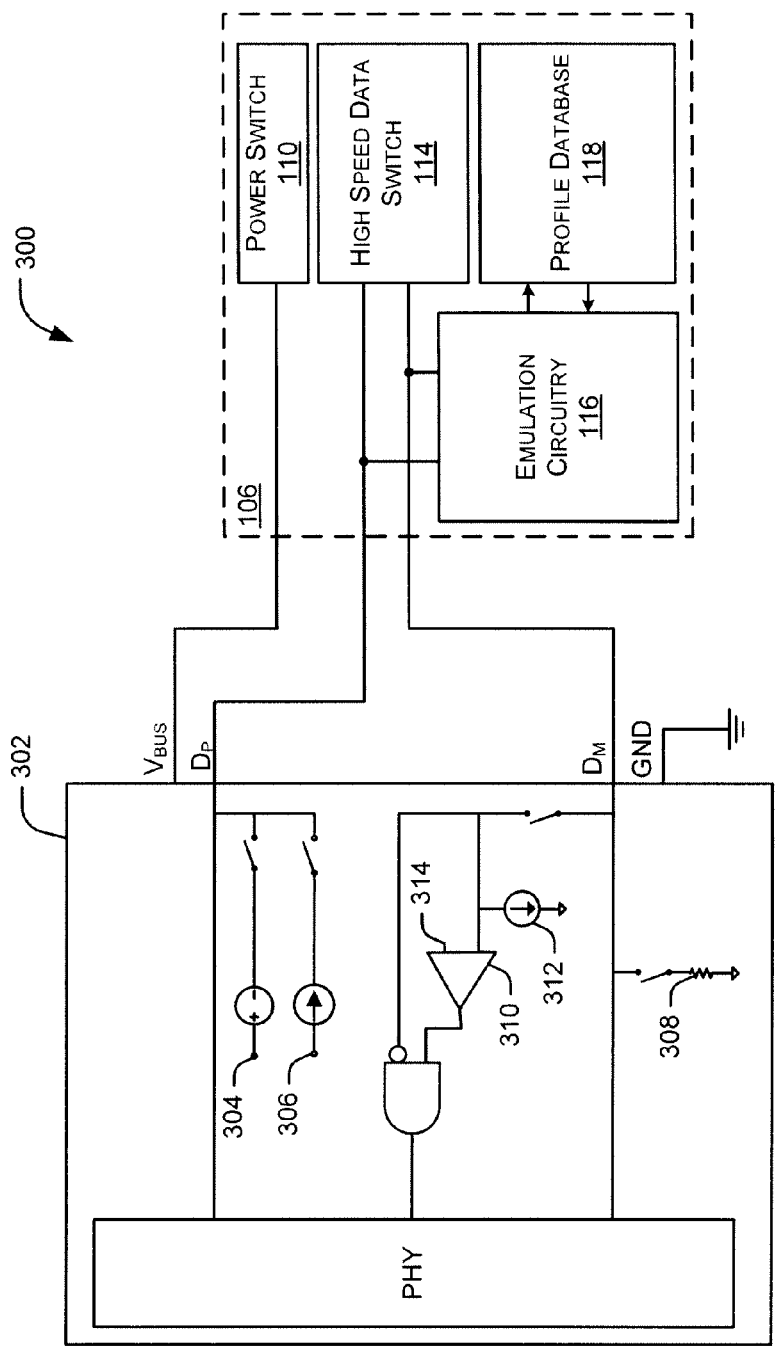
FIG. 3 is a block diagram illustrating an exemplary charging profile according to embodiments of the present invention.

FIG. 3 illustrates a typical BCS 1.1 compatible portable device 302 connected to the emulation circuit 106. The portable device includes a voltage source 304, a current source 306 a pull down resistor 308, a comparator 310, and a current sink 312.

When a BCS 1.1 compatible device 302 is connected to a conventional USB port, the device 302 first performs a DCD by turning on its voltage source 304 and current sink 312 (i.e., the portable device applies a voltage on the $D_P$ pin). The conventional charging downstream port, in response, applies a voltage on the $D_M$ pin. This voltage is compared with a reference voltage 314 in the portable device 302, and if the applied voltage is higher, the portable device 302 knows it is connected to a charging port. Then, optionally, the portable device 302 may distinguish between a dedicated charging port and a charging downstream port.

To this end, the portable device 302 applies a voltage on either the $D_P$ or $D_M$ data pin. If the port does not apply a voltage on the other data pin, the portable device 302 will know it is connected to a charging downstream port and it will begin charging accordingly.

To imitate this handshake, the emulation circuit 106, as depicted in FIG. 3, applies three stimulus-response pairs. The first stimulus is a voltage applied on the $D_P$ data pin that is greater than a threshold value (such as 0.8V). When the emulation circuit 106 detects this stimulus, it applies a pull-down resistor on the $D_P$ data pin pulling it low and starting a timer (this response corresponds to the typical BCS port response of applying a voltage on $D_M$ during DCD). As soon as the timer expires, the emulation circuit removes response 1 and looks for stimulus 2. By detecting response 1, the portable device 302 realizes it is connected to a USB port. Subsequently, to determine whether the device is connected to a charging or standard port, the portable device 302 applies a voltage on $V_{BUS}$. The emulation circuit 106 immediately recognizes this stimulus and applies a pull-down current on $D_P$. This is response 2. As stimulus 2 is related to $V_{BUS}$, the emulation circuit does not wait for stimulus 2 to be removed and does not remove response 2 before looking for stimulus 3, which is a voltage applied to the $D_P$ data pin that is greater than approximately 500 mV. On detecting this stimulus, the emulation circuit applies response 3, which is a voltage (~0.6V) on the $D_M$ data pin.

The portable device realizes it is connected to a charging port when it detects response 3. Response 3 may be applied for the duration of response timer or once the response timer expires (as configured). At this point, the portable device may begin charging its batteries. The emulation circuit considers the profile complete and stops looking for any other stimulus.

Before emulation begins, the emulation circuit applies $V_{BUS}$, and starts a profile timer. When the profile timer expires, the emulation circuit 106 removes the pull-down current from the $D_P$ pin and closes the high-speed switch. The portable device 302 removes the voltage on $D_P$ and the emulation circuit 106 removes the voltage on $D_M$. Subsequently, the portable device 302 may determine whether it is connected to a charging downstream port or a dedicated charging port. To this end, the emulation circuit 106 may include another set of stimulus-response pairs to aid the portable device 302 in identifying the type of charger.

Example 2

Apple® Charging Profile

This section describes the emulation cycling process with the help of a legacy charging profile—Apple® Nano™ Charger.

When an Apple® Nano™ iPod® is connected to a dedicated charger, it samples the voltage on both the USB data pins. If the voltage on the data pins is greater than a particular threshold value, the iPod® draws a charging current between 200-300 mA. If the voltage on both the data pins is lower than a threshold value, the iPod does not draw any current. If however, both the data pins are shorted together, the device draws suboptimal current. Moreover, the iPod measures the voltage on $D_P$ and $D_M$ right after $V_{BUS}$ is applied. And it compares this value to the thresholds within ~100 ms after detecting the voltages.

To emulate this charging profile, the emulation circuit 106 utilizes 2 stimulus-response pairs. The first stimulus is prior to $V_{BUS}$ application, and the response is application of a 2V voltage on $D_P$ data pin. The 2V voltage may be applied using a number of different techniques. For instance, a voltage source may directly output a 2V voltage on the $D_P$ pin. Alternatively, the emulation circuit 106 may employ a resistor divider between $V_{BUS}$ and GND with the center point at the $D_P$ data pin. The resistor value can be set to 125K, while the ratio is set to 0.4, which provides a 2V voltage on $D_P$.

The second stimulus can be similar to the first, while the second response is application of a 2.4V voltage on the $D_M$ data pin. The response is applied immediately after the stimulus. The portable device then calculates the detected signals on $D_P$ and $D_M$ and begins charging the iPod. If the device does not draw more than a threshold current and the profile timer expires, the emulation circuit 106 stops the Apple® charger profile. Consequently, all voltage, current, and resistors applied to the data pins are removed and the $V_{BUS}$ pin is reset. The next charger profile is then applied.

The methods and systems discussed in the present disclosure provide a mechanism to charge legacy and non-legacy devices using a single emulation circuit. The emulation circuit stores multiple charging profiles and includes emulation circuitry to apply and detect multiple responses and stimuli respectively. The emulation circuit cycles through the emulation profiles until the portable device charges optimally.

Those in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the present disclosure, which is determined solely by reference to the appended claims.

What is claimed is:

1. An emulation circuit for emulating a charging profile and charging a portable device through a universal serial bus (USB) port, the system comprising:
   a power switch for powering the emulation circuit;
   a high-speed data switch for transferring data between the portable device and a host; a USB receptacle port for communicating with the portable device;
   a profile database for storing one or more charging profiles, wherein each of the one or more charging profiles includes one or more stimulus-response pairs associated with a charging mode;
   a stimulus timer;
   a response timer;
   a profile timer; and
   emulation circuitry configured for selecting a charging profile from the profile database, wherein the selected charging profile is determined by the emulation circuitry by: selecting a first charging profile from the profile database, applying a voltage on the USB port, detecting, according to the stimulus timer, a first stimulus applied on the USB port by the portable device in response to the applied voltage, determining a corresponding response to the detected first stimulus based on the stimulus-response pairs associated with the first charging profile, applying, according to the response timer, the corresponding response on the USB port, and assigning the first charging profile as the selected charging profile if all of the stimulus-response pairs associated with the first charging profile are detected or selecting a second charging profile from the profile database if the profile timer expires before all of the stimulus response pairs associated with the first charging profile are detected.

2. The emulation circuit of claim 1, wherein the stimulus-response pairs of a charging profile are stored in a specific order and the emulation circuitry detects the stimulus generated by the portable device in the specific order.

3. The emulation circuit of claim 1, wherein the emulation circuitry detects a second stimulus after the first stimulus and the corresponding response to the first stimulus have been removed.

4. The emulation circuit of claim 1, wherein the emulation circuitry detects a second stimulus after applying a first response without removing the first response.

5. The emulation circuit of claim 1, wherein the charging profiles include one or more of battery charging specification (BCS) charging protocol or legacy charging protocols.

6. The emulation circuit of claim 1, wherein the emulation circuitry includes one or more of voltage source, current source, current sink, comparator, resistors, voltage dividers, or timers.

7. A method for charging a portable device using a universal serial bus (USB) port, the method comprising:
   attaching the portable device to an emulation circuit through a USB connector;
   powering the emulation circuit;
   cycling through one or more charging profiles, according to a profile timer, wherein each charging profile is comprised of one or more stimulus-response pairs and wherein the charging profiles are stored in a charging profile database and wherein cycling continues if the profile timer expires before all of the stimulus response pairs associated with a charging profile are detected;
   selecting a charging profile when a charging profile is identified that includes a charging mode allows the portable device to charge optimally.

8. The method of claim 7 further comprising:
   detecting a first stimulus associated with a charging profile; and
   applying a first response associated with the first stimulus according to the stimulus-response pairs.

9. The method of claim 8 wherein the stimulus-response pairs of a charging profile are cycled through in a predetermined order.

10. The method of claim 9 further comprising detecting a next stimulus associated with the charging profile when the first response is removed.

11. The method of claim 10 further comprising applying a next response associated with the next stimulus.

12. The method of claim 11 wherein the next stimulus is detected even if the first response is not removed when the first stimulus is associated with a voltage pin of the USB port.

13. The method of claim 11, wherein the portable device begins drawing current from the emulation circuit when all the stimulus-response pairs associated with the charging profile are applied.

14. The method of claim 11, wherein the stimulus comprises at least one of voltage applied on a VBUS pin, high or low voltage signal applied on one or both data pins (DP and DM), high or low current signal applied on one or both the data pins (DP and DM).

15. The method of claim 11, wherein the response comprises at least one of voltage applied on a VBUS pin, high or low voltage signal applied on one or both data pins (DP and DM), high or low current signal applied on one or both of the data pins (DP and DM), pull-down resistor connected to one or both of the data pins, or a resistor-divider applied from VBUS to one or both of the data pins.

16. A method for emulating one or more charging profiles to charge a portable device through a USB port, the method comprising:
   a) selecting a charging profile from a charging profile database;
   b) applying the selected charging profile, wherein the charging profile includes one or more stimulus-response pairs and an associated charging mode;
   c) applying a voltage on the USB port;
   d) monitoring the USB port to detect a stimulus applied by the portable device in response to the applied voltage;
   e) determining a corresponding response to the detected stimulus based on the stimulus-response pairs associated with the selected charging profile;
   f) applying the corresponding response to the USB port;
   g) abandoning the selected charging profile if all of the stimulus-response pairs associated with the selected charging profile are not detected within the time specified by a profile timer
   h) repeating steps d-g until all the stimulus-response pairs associated with the selected charging profile have been detected.

17. The method of claim 16 further comprising at least one of:
   removing all the stimulus and the response from the USB port; or
   resetting the portable device and applying a next charging profile.

18. The method of claim 16, wherein the stimulus-response pairs of a charging profile are stored in a specific order and wherein the stimulus are detected in the specific order they are stored.

* * * * *